Patented Dec. 24, 1940

2,225,923

UNITED STATES PATENT OFFICE 2,225,923

PREPARATION OF HYPOCHLORITES

Irving E. Muskat, Akron, and George H. Cady, Wadsworth, Ohio, assignors to Pittsburgh Plate Glass Company, Allegheny County, Pa., a corporation of Pennsylvania No Drawing. Application July 23, 1938, Serial No. 221,019

6 Claims. (Cl. 23—86)

This invention relates to the production of hypochlorites of the alkaline earth metals of high active or available chlorine content. In the production of these materials it is often difficult to secure a compound having sufficient active chlorine for many purposes. While the true hypochlorites are most desirable and in their pure form contain maximum concentrations of active chlorine, their production upon a commercial basis is extremely difficult. Thus, when calcium hydroxide is treated with chlorine, ordinary bleaching powder containing but 35–38 percent active chlorine is formed. By various manipulative methods, this product may be improved to the extent that calcium hypochlorite containing 65–72 percent has been commercially produced. Prior to this invention, however, products containing higher concentrations have not, to our knowledge, been produced commercially.

In accordance with our invention, we have been able to increase the active chlorine content of chlorine compounds wherein it is undesirably low and to produce products containing 80–90 percent or more of available chlorine. We have found that products of high available chlorine content may be secured by treatment of compounds of the alkaline earth group metals containing a chloride group with chlorine monoxide. In addition, we have found that this process may be carried out using mixtures of chlorine and chlorine monoxide with exceptionally good results even when the chlorine monoxide concentration is relatively low. These mixtures may be prepared in a simple and economical manner.

The process is particularly adapted to the treatment of chlorides of the alkaline earth metals such as ordinary bleaching powder, calcium chloride, barium chloride, strontium chloride, baryta or strontia bleaching powder, etc. Especially effective results have been secured in the treatment of products relatively low in available chlorine to increase the content of this agent. Thus, it has been found that bleaching powder or other hypochlorites of calcium, barium or strontium containing from 30–75 percent of available chlorine may be treated to increase this concentration to 80–90 percent or higher.

In treating these compositions, it is found preferable to maintain the temperature of treatment above 25° C. at least during the latter portion of the treatment. Operation at such temperature permits the production of a product of much higher available chlorine content than would be produced at lower temperatures. This temperature may be maintained throughout the entire period of treatment or, if desired, the initial treatment may be carried out at a somewhat lower temperature. In general, it is preferred to carry out the reaction at 25–50° C. although temperatures up to 100° C. or higher may be suitable for certain purposes.

The reaction is preferably carried out in the presence of a quantity of water or moisture which appears to assist the reaction. In general, it is preferred to treat a solid composition which contains moisture or which is wet with water. While solutions may be treated, it is preferable to treat solid compositions since evaporation and the decomposition resulting from evaporation may be avoided in this manner. If desired, aqueous slurries of the alkali or alkaline earth metal compounds may be treated in accordance with our invention. Or, the composition may be treated as a suspension in various inert liquids, such as carbon tetrachloride, stannic chloride, titanium tetrachloride, etc.

The chlorine monoxide treatment is preferably carried out in the presence of a suitable diluent in order to decrease the rate of reaction and thus to prevent formation of chlorate or decomposition of chlorine monoxide or the hypochlorite. Inert gases, such as air, nitrogen, helium, etc., are found to be suitable for this purpose. In general, we find it desirable to treat with a mixture of chlorine and chlorine monoxide since the presence of chlorine appears to assist the action of the chlorine monoxide and to permit a more complete reaction with the consequent production of a purer material. Additionally, when bleaching powder or similar mixtures which may contain more or less hydroxides, in addition to hypochlorites or chlorides, are treated, the chlorine appears to convert a portion of the residual hydroxide into the corresponding hypochlorite-chloride mixture which is in turn converted into a purer form of hypochlorite by the chlorine monoxide.

The chlorine monoxide may be prepared by convenient methods such as by contacting chlorine with mercuric oxide as described in our copending application, Serial No. 136,802, filed April 14, 1937, or with sodium carbonate or other alkaline alkali metal compound preferably in the presence of some water as described in an application of George H. Cady, Serial No. 190,618, filed February 15, 1938, or application Serial No. 216,475, filed June 29, 1938 or by contact with barium hydroxide or by other methods. The concentration of chlorine monoxide present in the gaseous treating agent may be widely varied in accordance with the method of preparation. When the chlorine monoxide is prepared with mercuric oxide, the chlorine monoxide concentration may be 30–40 percent or higher by volume of the total gas. In other cases, however, it may be as low as 1 to 4 percent by volume of the total gas. The ratio of chlorine to chlorine monoxide is likewise capable of some variation being dependent upon the method of manufacture. Where mercuric oxide is used, up to about 85 percent by volume of the chlorine may be converted to chlorine monoxide. However, where gaseous chlorine is contacted with solid sodium carbonate, bicarbonate, hydroxide or other alkaline compound in the presence of a small amount of water, smaller portions of chlorine may be converted into chlorine monoxide. It has been found that gaseous mixtures derived from such treatments may be used to contact calcium chloride or other similar agent even when a relatively minor amount, for example, 25 percent or below of chlorine is converted into chlorine monoxide. This affords a simple method of recovering chlorine monoxide from gaseous mixtures in which the chlorine monoxide content may be relatively low.

Where the chlorine monoxide is prepared by contacting chlorine with solid sodium carbonate, an undesirable quantity of carbon dioxide may be present in the gaseous mixtures. The chlorine and chlorine monoxide may be separated from the carbon dioxide by passing the mixture through a suitable solvent for chlorine and chlorine monoxide, such as carbon tetrachloride. This solution may be used to treat the chlorides to be converted into hypochlorites. If desired, solutions of chlorine monoxide in suitable solvents, such as carbon tetrachloride, may be prepared by other means, for example by contacting a carbon tetrachloride solution of chlorine with hydrated sodium carbonate or similar alkaline agent. In such cases, the percentage conversion of chlorine may be relatively high and the ratio of chlorine monoxide concentration to chlorine concentration correspondingly high.

Upon treatment of the chlorides in accordance with my invention, a substantial portion of the chlorine monoxide is found to be removed from the mixture while the major portion of the chlorine remains. This gas may be recycled for conversion of further quantities of chlorine.

The following examples are illustrative:

Example I

A quantity of bleaching powder prepared by chlorination of calcium hydroxide and containing 35 percent active chlorine was contacted with a gaseous stream containing 18 volumes of air, 6 volumes of carbon dioxide, 5 volumes of chlorine and one volume of chlorine monoxide prepared by contacting a mixture of air and chlorine with solid sodium hydroxide. A temperature of 35° C. was maintained and the reaction was carried out until a product containing 83 percent active chlorine was secured. The gases evolved from this treatment were recycled.

Example II

Five parts by weight of calcium chloride was agitated in a carbon tetrachloride solution containing 8 grams of chlorine and 60 grams of chlorine monoxide per liter for ninety minutes at a temperature of 40° C. The product, after separation of the carbon tetrachloride, contained 83 percent active chlorine.

Example III

A stream of gas containing 10 percent by volume of chlorine monoxide and 90 percent air was passed over a body of bleaching powder at a temperature of 40° C. and a product containing 86 percent available chlorine was secured.

Although the present invention has been described with reference to the specific details of certain embodiments thereof, it is not intended that such details shall be regarded as limitations upon the scope of the invention except insofar as included in the accompanying claims. This application is a continuation-in-part of copending application Serial No. 136,804.

We claim:

1. A method of increasing the active chlorine content of bleaching powder which comprises treating bleaching powder with a mixture which initially contains chlorine and chlorine monoxide.

2. A method of increasing the active chlorine content of bleaching powder which comprises treating bleaching powder with chlorine monoxide.

3. A method of increasing the active chlorine content of bleaching powder which comprises treating bleaching powder with chlorine monoxide at a temperature in excess of 25° C.

4. A method of increasing the active chlorine content of a composition containing an alkaline earth metal hypochlorite and a chloride and having an active chlorine content not less than about 30 percent, which comprises treating said composition with chlorine monoxide until the active chlorine content has been substantially increased.

5. A method of increasing the active chlorine content of a composition containing calcium hypochlorite and calcium chloride and having an active chlorine content not less than about 30 percent, which comprises treating said composition with chlorine monoxide until the active chlorine content has been substantially increased.

6. The method of claim 5 wherein the composition is treated with a mixture which initially contains chlorine and chlorine monoxide in concentrations up to 85 volumes of chlorine monoxide per 15 volumes of chlorine.

IRVING E. MUSKAT.
GEORGE H. CADY.